June 16, 1959

L. L. LEE 2,890,518

NEEDLE BEARING ASSEMBLY MACHINE

Filed May 27, 1957

INVENTOR
LLOYD L. LEE

SMITH, OLSEN, LEWIS & McRAE
ATTORNEYS

June 16, 1959
L. L. LEE
2,890,518
NEEDLE BEARING ASSEMBLY MACHINE
Filed May 27, 1957
5 Sheets-Sheet 2
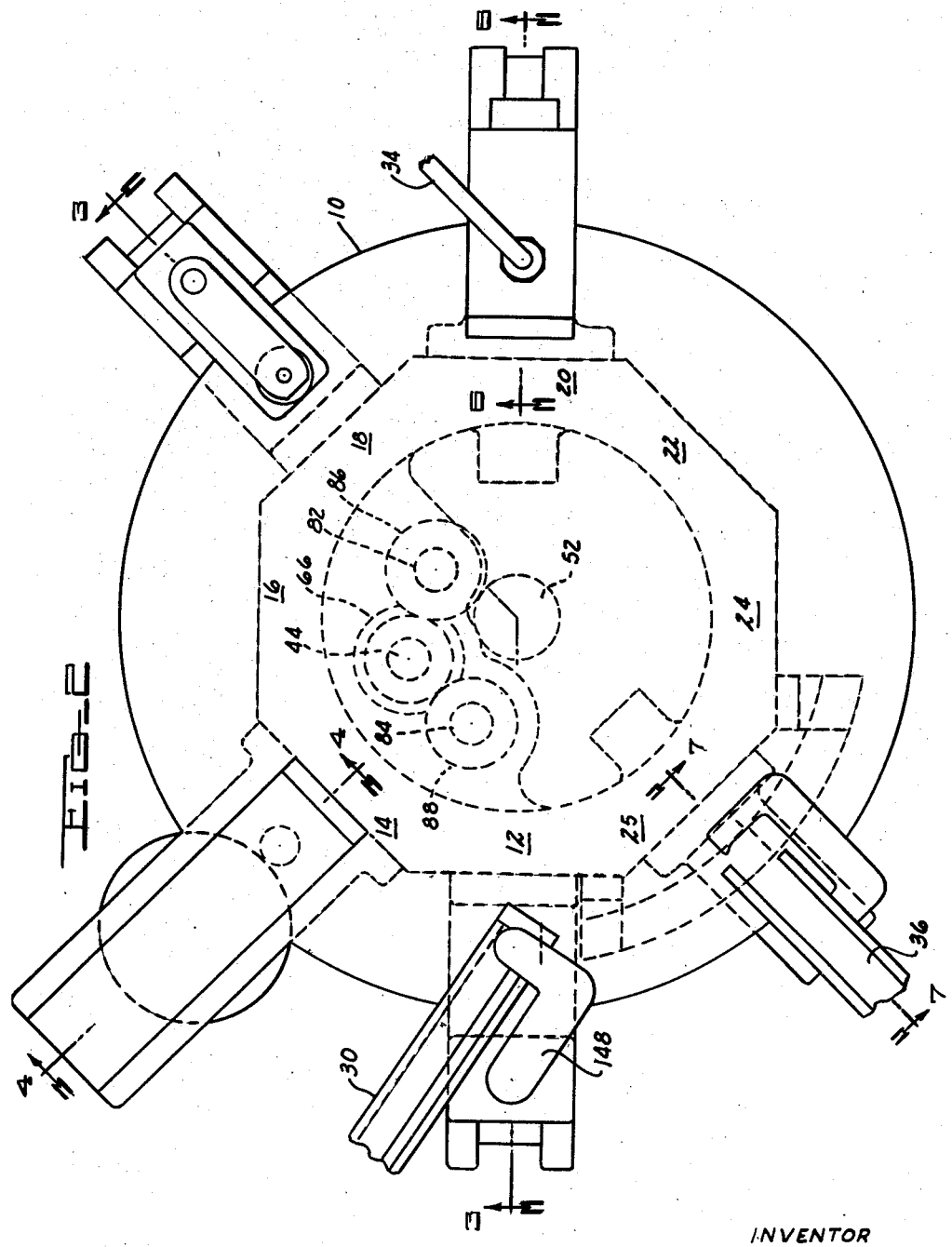
INVENTOR
LLOYD L. LEE
SMITH, OLSEN, LEWIS & McRAE
ATTORNEYS

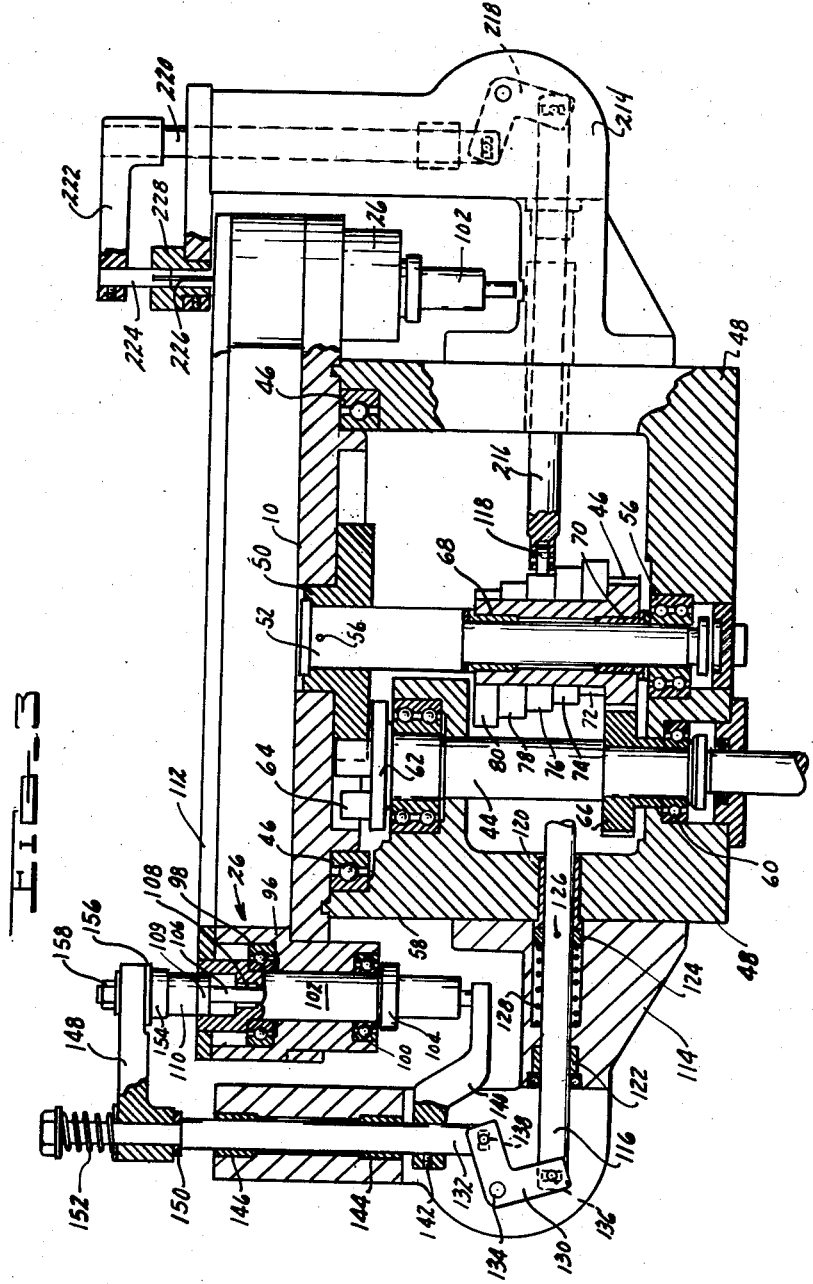

June 16, 1959
L. L. LEE
2,890,518
NEEDLE BEARING ASSEMBLY MACHINE
Filed May 27, 1957
5 Sheets-Sheet 4
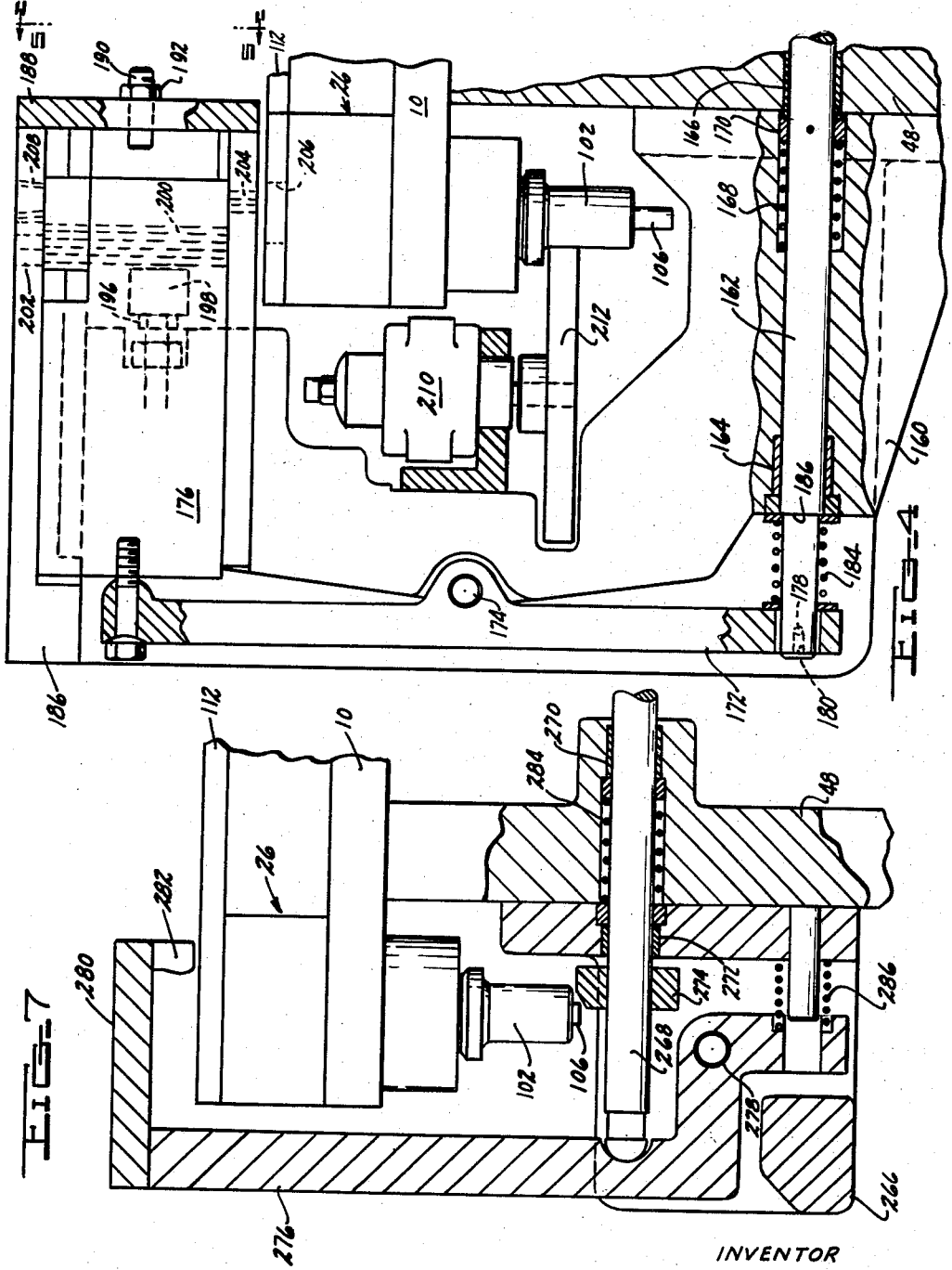
INVENTOR
LLOYD L. LEE
SMITH, OLSEN, LEWIS & McRAE
ATTORNEYS

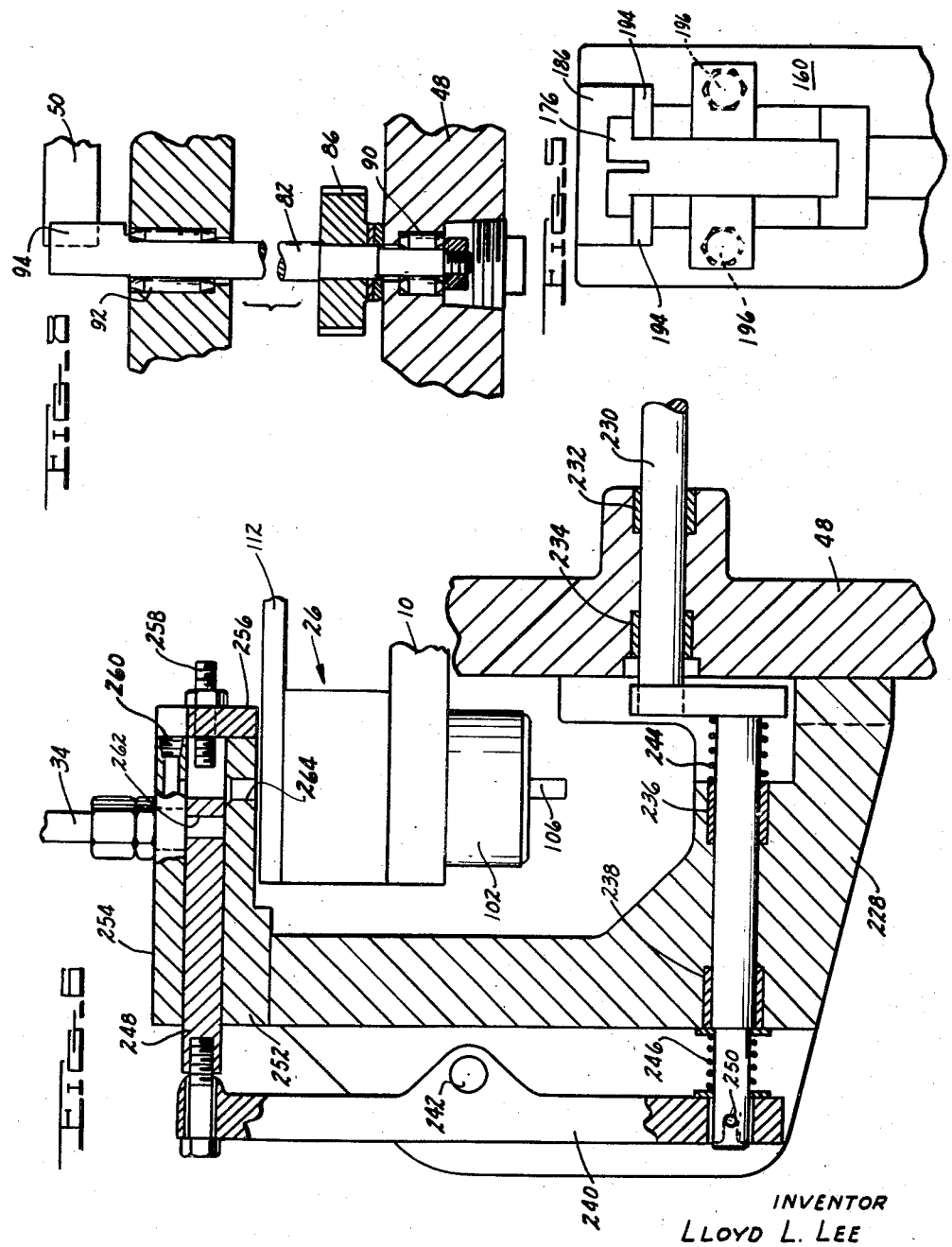

United States Patent Office 2,890,518
Patented June 16, 1959

2,890,518

NEEDLE BEARING ASSEMBLY MACHINE

Lloyd Leslie Lee, Detroit, Mich., assignor to Omer E. Robbins Company, Redford, Mich., a corporation of Michigan Application May 27, 1957, Serial No. 661,908

11 Claims. (Cl. 29—201)

The present invention relates to apparatus for assembling needle bearings into a gear, race, cup, container or the like. For the purpose of simplicity, the term "container" will be used throughout the application to mean all conventional types of structures that may be used for housing such needle bearings.

It is an object of the present invention to provide apparatus for assembling needle bearings in a container wherein the entire operation can be performed automatically, thereby assuring low production costs and uniformly accurate products.

It is another object of the present invention to provide apparatus for automatically assembling needle bearings in a container wherein centrifugal force is used to position the needle bearings in the container.

It is still another object of the present invention to provide apparatus of the foregoing character wherein means may be employed for assuring that all needle bearings are properly positioned without detracting from the speed of assembling the bearings nor without appreciably increasing the production costs of such bearings.

It is still another object of the present invention to provide an automatic needle bearing assembly machine which is constructed and arranged to have an endless conveyer mechanism operatively associated with a plurality of stations at which the steps of assembling of the container and needle bearings can be performed in rapid sequence.

It is still another object of the present invention to provide an automatic needle bearing assembly machine of the foregoing character wherein said conveyor mechanism is a rotatable indexing table and functions are performed at various stations by mechanical movements transmitted through cams rotatable with said indexing table, thereby synchronizing all operations of the assembly machine.

It is still another object of the present invention to provide an automatic needle bearing assembly machine of the foregoing character wherein rotatable fixtures are mounted on said indexing table for carrying the needle bearing containers, and wherein drive means are provided for rotating said fixtures at and between certain stations for positioning and holding needle bearings in place by centrifugal forces.

It is still another object of the present invention to provide an automatic needle bearing assembly machine of the foregoing character wherein means are provided for rotating the fixture at one speed at the station where the needle bearings are initially inserted into the container and for rotating the fixture at subsequent stations at a relatively higher speed, thereby initially orientating the needle bearings in the container under the most favorable circumstances, and thereafter, as a result of the high speed rotation, of throwing the needle bearings into their proper positions by centfrifugal force.

It is still another object of the present invention to provide an automatic needle bearing assembly machine of the foregoing character wherein means are provided for correcting any misalignment of the needle bearings that may exist after they have been subjected to the continuous high speed rotation.

It is still another object of the present invention to provide means for inserting a retaining element in operative relation with respect to the needle bearings so that they do not collapse from their proper positions after the rapid rotation of the container has been discontinued.

It is still another object of the present invention to provide means for ejecting the needle bearing assembly from the machine.

Other objects of this invention will appear in the following description and appended claims, reference being had to the accompanying drawings forming a part of this specification wherein like reference characters designate corresponding parts in the several views.

In the drawings:

Figure 2 is an enlarged plan view, with portions removed, of the embodiment shown in Figure 1;

Figure 3 is an enlarged fragmentary section taken on the line 3—3 of Figure 2;

Figure 4 is an enlarged fragmentary section taken on the line 4—4 of Figure 2;

Figure 5 is a fragmentary end elevation viewed in the direction of the arrows 5—5 of Figure 4, with portions removed;

Figure 6 is a fragmentary section taken on the line 6—6 of Figure 2;

Figure 7 is a fragmentary section taken on the line 7—7 of Figure 2; and

Figure 8 is a fragmentary section through one of the blocking shafts shown by hidden lines in end elevation in Figure 2.

Figure 1:
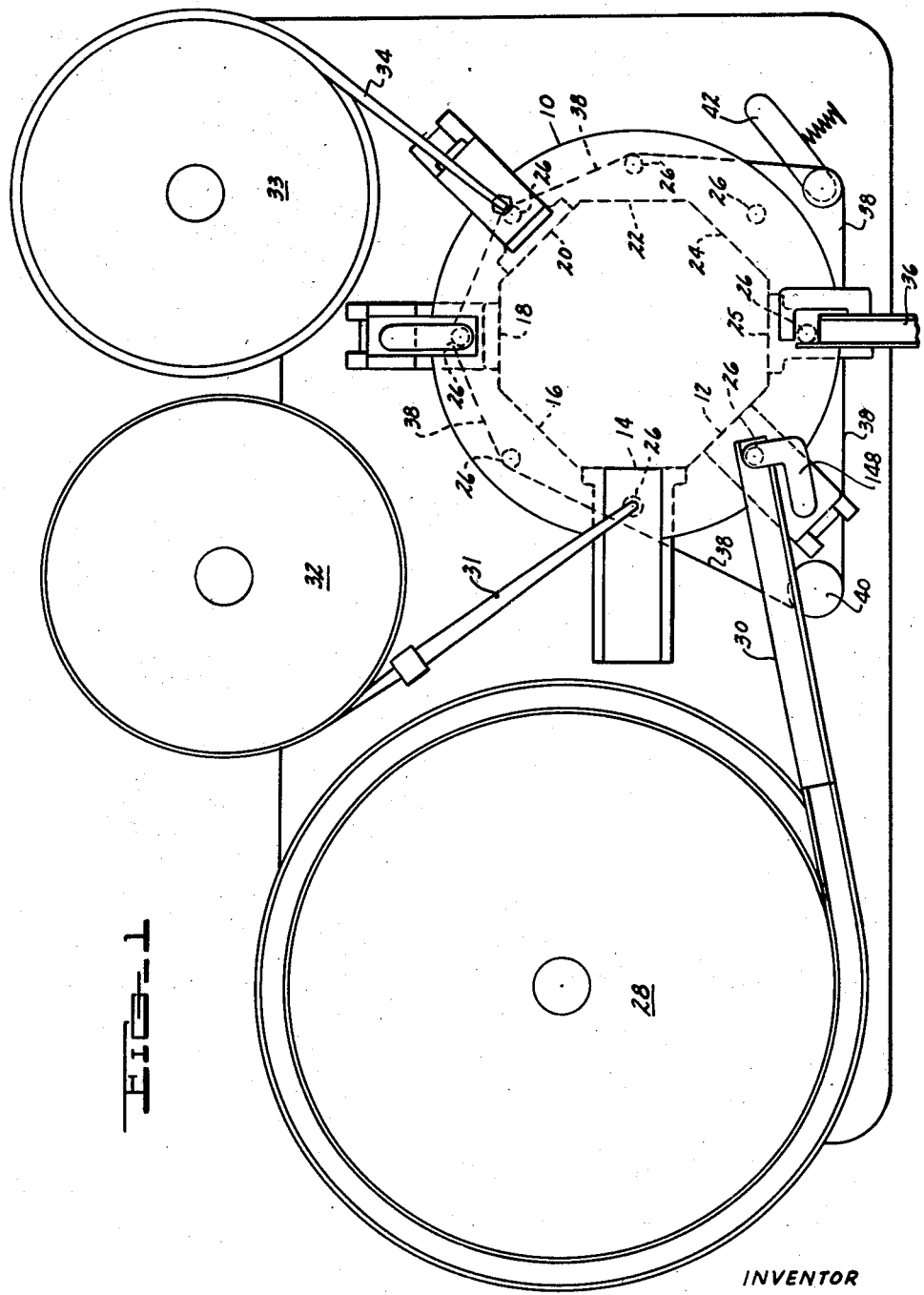
Figure 1 is a plan view, partially schematic, of an automatic needle bearing assembly machine embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The general arrangement of the needle bearing assembly machine will first be explained with respect to Figure 1, after which the various parts will be more fully described.

Index table 10 is rotatably mounted and is indexed by a Geneva drive as will be more fully described hereinafter. The index table 10 has eight stations which are indicated generally by the reference numbers 12, 14, 16, 18, 20, 22, 24 and 25. Rotatably mounted on the index table 10 are eight fixtures 26, corresponding in number to the eight stations. Each of these fixtures is designed to carry a cylindrical container in which needle bearings are to be inserted.

The first station 12 is arranged so that the container can be fed from an orientnig vibratory feeder 22 down a track 30 into the first fixture 26. On indexing of the table 10, the first fixture 26 will be moved to station 14 where the container will receive a prescribed number of needle bearings, and at the same time the fixture 26 will be rotated so as to orient the needle bearings as they are being inserted into the container. The needle bearings are fed through four tubes in the conduit 31 from the vibratory feeder 32.

Again, as the table 10 is indexed, the fixture 26 with its container needle bearings will be transferred to the station 16 where the rotation of the fixture will be increased to a relatively high rate of speed to throw the needle bearings by centrifugal force against the inner side wall of the container so as to assemble them and hold them in their intended positions.

The next indexing of table 10 will result in the fixture 26, with its container and positioned needle bearings, being moved to station 18. At this station and during movement from station 16, the fixture 26 is continuously rotated at the high rate of speed so as to keep the needle bearings in place. At station 18, a probe element is inserted into the container off set from the axis of rotation of the fixture to detect any misplaced needle bearings and to properly align the same. This is accomplished merely by the misplaced needle bearing or bearings contacting the probe elements causing the bearings to be dislodged from their misaligned positions. The centrifugal forces acting on the bearings will throw them outwardly so that utimately they will find their proper positions.

When the table 10 is again indexed, the continuously rotating fixture 26 with its container and needle bearings is moved to station 20 where a vibratory feeder 33 feeds a retainer or pin through tube 34 into the center of the container so that the retainer or pin will hold the needle bearings in place after the container has been removed from the fixture 26.

Station 22 and 24 are merely idle stations. The fixture 26 is continuously rotated at the high rate of speed from stations 16 to 22, but not at idle station 24 nor at station 25 to which the fixture 26 and its contents will eventually arrive by the indexing operation. At station 25, the container with its needle bearings and retainer is lifted out of the fixture 26 and ejected onto a discharge track 36.

The fixtures 26 are rotated at the high rate of speed in the present embodiment of the invention by the belt 38 which is driven by an electric or air motor 40. The belt 38 contacts the fixtures only at stations 16 to 22 and is kept taut by a spring loaded idler pulley 42. The means for driving the fixture 26 at slow speed at station 14 will be described hereinafter in connection with the description of that station.

Referring now to Figures 2 and 3, a more complete description of the indexing table 10 will be given. As previously stated, the indexing mechanism is a Geneva drive having a driver flange shaft 44 that is driven by any suitable electric, air of hydraulic motor (not shown). The table 10 is carried on the roller bearing 46 that is pressed into the housing 48. A driven Geneva cam wheel 50 is bolted to the table 10 and a cam shaft 52 extends through the Geneva cam wheel 50 and is locked in place by a pin 54. The lower end of cam shaft 52 is held in place by the roller bearing 56.

The driver flange shaft 44 is retained in place at the upper end by roller bearing 58 and at the lower end by roller bearing 60. The flange 62 on the upper end of shaft 44 has a cam roller 64 secured thereto and which is operative to drive the table 10 intermittently on rotation of shaft 44. A gear 66 is keyed and locked to the lower end of shaft 44 and is in mesh with a gear 46 that is free to rotate on the bronze bearings 68 and 70 that are carried on the cam shaft 52. Cams 72, 74, 76, 78 and 80 are keyed and held in place on the shank of the gear 46 for rotation therewith. Thus, when the shaft 44 is rotated by its driving motor (not shown), the cam roller 64 will index the table 10 and the gear 44 will drive the gear 46 and thereby the cams 72, 74, 76, 78 and 80 in synchronism therewith. As will be explained, the cams 72, 74, 76, 78 and 80 are associated with the different stations discussed above, and they serve to actuate the mechanisms at such stations.

In Figure 2, a pair of blocking shafts 82 and 84 can be seen which have gears 86 and 88 in mesh with the gear 66 keyed to driver shaft 44. Figure 8 shows a section through blocking shaft 82 and it is to be understood that blocking shaft 84 is similarly constructed and mounted. The shaft 82 is rotatably mounted in the needle bearings 90 and 92 and has the blocking element 94 at its upper end to stop rotation of the table 10 at the proper time in the indexing cycle. A similar blocking element is found on shaft 84 to prevent back rotation of the index table 10.

The table 10 has eight fixtures 26 uniformly spaced around its outer edge. One such fixture 26 is shown in section in Figure 3 to which reference is now made. The fixture 26 has an outer body 96 which is bolted to the table 10. Roller bearings 98 and 100 are pressed into the outer body 96 and a rotatable container housing 102 is fitted through the bearings 98 and 100 and is locked in place by the lock nut 104. A lifter rod 106 pilots through bearing 108 and through the center hole of the container housing 102. A flat head 109 is formed on the upper end of lifter rod 106 on which a container 110 is adapted to be seated. As shown in Figure 3, the lifter rod 106 is in its elevated position, and when lowered the container will be carried within the container housing 102. Bolted to each of the fixtures 26 is a retaining ring 112.

Details of the operating mechanisms at each of the various stations will next be described, beginning with the first station 12 at which the containers 110 are fed into the rotatable container housing 102. Referring to Figure 3, a cast metal support 114 is shown bolted to the housing 48. A push rod 116 having a cam roller (not shown) on its inner end extends through housing 48 and has its cam roller (not shown) operatively contacting cam 74 in the same manner as shown by the cam roller 118 associated with station 20. The rod 116 is piloted through housing 48 and support 114 by the bronze bearings 120 and 122.

A retaining collar 124 is held in place on rod 116 by a pin 126, said collar 124 cooperating with spring 128 to urge the push rod 116 against its cam 74.

A bell crank 130 is provided to change direction of movement of rod 116 to rod 132. For this purpose, the bell crank 130 is pivotably mounted to the support 114 by the pin 134, and the ends of the bell crank arms are suitably connected to the ends of rods 116 and 132 by the pins 136 and 138. A lifting rod lever 140 is secured to rod 132 by the screw 142. As seen in Figure 3, the lifting rod lever is in its raised position, and at station 12 it cooperates with the lifter rod 106 and flat head 109 to keep the container 110 straight while being pushed into the rotatable housing 102.

The rod 132 is piloted through the support 114 by the bearings 144 and 146. An offset plunger arm 148 is keyed to rod 132 and is provided with the proper clearance by the height spacer 150. A spring 152 is operatively disposed between the upper end of rod 132 and the plunger arm 148 to allow for any interference that might inadvertently occur when rod 132 lowers plunger arm 148, container 110 and lifter rod 106. The plunger arm button 154 and spacer 156 are retained on the plunger arm 148 by the nut 158.

From the foregoing descriptions with respect to Figures 1 and 3, it is to be understood that each container 110 is fed down the track 30 where it is guided between the flat head 109 and the button 154 which are then in the elevated positions shown in Figure 3. Rotation of cam 74 will thereafter cause the container to be lowered into the fixture 26 for movement to the next station by operation of the Geneva indexing mechanism.

The next station 14 will now be described with particular reference being made to Figures 1, 4 and 5. A cast metal support 160 is bolted to the housing 48. A rod 162 extends through the support 160 and housing 48 and is piloted by two bronze bearings 164 and 166. The spring 168 and retainer 170 cooperate to urge the rod 162 inwardly so that its end which has a cam roller (not shown), can engage and follow cam 72 on cam shaft 52 (Figure 3).

An arm 172 is pivotally mounted on pin 174 to the support 160, having its upper end secured to the shuttle slide 176 and its lower end slidably fitted over the reduced end of rod 162. A pin 178 extends through rod 162 and fits into the slots 180 in arm 172. The spring 184 is operatively positioned between the shoulder 186 of the rod 162 and the arm 172. When the rod 162 is cammed toward the arm 172, the spring 184 will take the load of the shuttle slide 176, and if the shuttle slide 176 encounters resistance, spring 184 will compress. The pin 178 operates to return the shuttle slide 176 when the rod 162 returns to the right as seen in Figure 4.

A shuttle slide retainer 186 is bolted to the support 160. A stop plate 188 contains a stop screw 190 and lock nut 192 to stop the shuttle slide 176 in the correct position to discharge needle bearings as will be described. Keeper plates 194 are bolted to the slide retainer 186. Stop bolts 196 screwed into support 160 assures correct alignment of the shuttle slide 176 when in its back position shown in Figure 4. This is accomplished by the cross member 198 of shuttle slide 176 which contacts the stop bolts 196.

It will be observed that the shuttle slide 176 has a plurality of vertical ducts 200 each adapted to receive a prescribed number of needle bearings from the conduit 31, Figure 1. In the disclosed embodiment, there are four tubes for the needle bearings in the conduit 31 and a corresponding number of vertical ducts 200 in the shuttle slide 176. When the shuttle slide 176 is in the position shown in Figure 4, the needle bearings can be loaded from the conduit 31 through the stationary ducts 202 in the shuttle slide retainer 186 and into the vertical ducts 200. On movement of the shuttle slide 176 to the right by arm 172, the needle bearings will drop through the stationary ducts 304, then through the opening 206 in the retainer ring 112 and into the container 110, Figure 3. Since only a predetermined number of needle bearings can be stacked one above the other in the vertical ducts 200, such predetermined number will always be deposited in the containers that pass through this station. The ducts 208 in the slide retainer allow air to flow into the ducts 200 when the needle bearings are discharged through ducts 204.

In order to facilitate the rapid discharge of the needle bearings into the containers, means are provided for rotating the fixture and container while under the ducts 204. For this purpose a motor 210 is provided for continuously turning the friction wheel 212 which engages the rotatable container housing 102. This causes the container to rotate slowly around its axis thereby assisting in receiving and orientating the needle bearings discharged from the shuttle slide 176.

As previously explained, the container 110 with its load of needle bearings passes next to station 16 where the belt 38, Figure 1, engages the rotatable container housing 102, causing it to rotate rapidly, thereby throwing the needle bearings by centrifugal force against the inner wall of the container 110. However, it is recognized that in some instances the needle bearings may not be properly arranged around the wall of the container and it is then necessary to insert a probe element into the container so that as the container rotates, such needle bearings as are misaligned will strike the probe element and once again be thrown outwardly by centrifugal forces against the wall of the container.

This probing operation is performed at station 18 which is similar to station 12, previously described. This station can be seen on the right side of Figure 3. A cast metal support 214 is bolted to housing 48. The rod 216 extends through the support 214 with the cam roller 118 at its inner end engaging cam 76. The other end of rod 216 is connected to bell crank 218 for converting its horizontal movements into vertical movements in rod 220. The latter has an arm 222 fastened to its upper end. The arm 222 supports a probe tool holder 224 which in turn carries a probe element 226. A probe tool bushing is secured to the top of the support 214.

The probe element is offset from the axis of revolution of the rotatable container housing 102 so that it will be engaged by any of the needle bearings in the rotating container 110 which are not in proper upright position along the inner wall of said container.

Station 20 serves to insert a pin or other type of retainer into the revolving container for keeping the needle bearings in place after the container has been removed from the needle bearing assembly machine. This station will be described with reference to Figure 6. A cast metal support 228 is bolted to the housing 48, piloted by four bushings 232, 234, 236 and 238. The inner end has a cam wheel (not shown) for following on cam 80, Figure 1. The outer end of rod 230 is operatively connected to arm 240 by the same mechanism employed between rod 162 and arm 172 at station 14. The arm 240 is pivotally mounted on support 228 by pin 242. Spring 244 is disposed between rod 230 and support 228 to urge the cam roller (not shown) against the cam 80. Spring 246 is operably disposed between support 228 and the lower end of arm 240 to take the load of the shuttle slide 248 which is attached to the upper end of arm 240, and if shuttle slide 248 encounters resistance, spring 246 compresses. Pin 250 returns shuttle slide 248. The latter is carried between the slide body 252 and slide cover 254 which are bolted together and to the support 228. The tube 34 is suitably secured to the slide cover 254. A stop plate 256 is also secured to the slide cover 254 and to the slide body 252. Two stop screws 258 are positioned in stop plate 256. An air vent passageway is provided at 260.

In normal operation, the shuttle slide 112 will transfer a single retainer (not shown) in the duct 262 which has been fed thereinto from tube 34 over to the stationary duct 264 where it will drop into the center of container 110 and its needle bearings. Since the container 110 will still be rotating rapidly at station 20, the needle bearings will be around the inner periphery of the container and the retainer (not shown) will fit in the center of the container so as to retain the needle bearings in place.

The container with its needle bearings and retainer then pass through stations 22 and 24 to station 25 where they are ejected.

Station 25 will be described with reference to Figure 7. Cast metal support 266 is bolted to housing 48. A rod 268 extends through housing 48, piloted by bearings 270 and 272. A lifting dog 274 is fitted on rod 268 and acts to raise the lifter rod 106, and thus, the container from the rotatable housing 102. Still further advancement to the left of rod 268 causes arm 276 to pivot backward around pivot pin 278, thereby sweeping the raised container into the chute 36, Figure 1. To assist in the sweeping operation the arm 276 has attached thereto the sweeper element 280 with the downward extending finger 282.

The spring 284 is operatively disposed between rod 268 and support 266 for urging the rod with its cam roller (not shown) against cam 78. The spring 286 is operatively disposed between arm 276 and support 266 for urging the arm back to its normal position, shown in Figure 7, after the sweeping operation has been completed.

From the foregoing, it will be understood that the described method and apparatus results in a continuous operation of assemblying needle bearings in a container and ejecting the container and needle bearings with the latter in a retained position.

I claim:

1. An automatic needle bearing assembly machine for asembling needle bearings in a container comprising an endless conveyor mechanism adapted to be halted intermittently at a plurality of stations, a series of rotatable fixtures carried by said conveyor mechanism at spaced intervals so that a fixture will be at each station when the conveyer mechanism is halted, a container feed mechanism for inserting a container into each fixture as such fixture is at rest at the first station, a needle bearing metering mechanism for introducing a prescribed number of needle bearings into the container of a fixture while the latter is at the second station, means at said second station for rotating the fixture at a relatively slow speed to aid in orienting the needle bearings as they are introduced into said container, drive means at the third, fourth and fifth stations for rotating the fixtures at and between such stations continuously at a relatively high rate of speed to position the needle bearings by centrifugal force around the inner walls of the container by the fixtures, a probe mechanism at the fourth station for momentarily introducing a probe element into the container to assure that the needle bearings are properly oriented, a retainer inserting mechanism at the fifth station for inserting an element into the container for holding the needle bearings in their proper positions along the wall of their container, and an ejector mechanism for lifting the container with the assembled needle bearing from its associated fixture and ejecting the same from the machine.

2. An automatic needle bearing assembly machine as claimed in claim 1 wherein said endless conveyer mechanism comprises an indexing table having a Geneva drive.

3. An automatic needle bearing assembly machine as claimed in claim 1 wherein said container feed mechanism includes an orienting vibratory feeder and a track down which the containers can slide from said feeder to the fixture for holding the container.

4. An automatic needle bearing assembly machine as claimed in claim 1 wherein said needle bearing metering mechanism includes a vibratory feeder and a plurality of tubes for delivering the needle bearings to a shuttle device which carries the prescribed number of needle bearings to each container.

5. An automatic needle bearing assembly machine as claimed in claim 1 wherein said means for rotating the fixture at a relatively slow rate comprises an air driven motor and a friction wheel operatively connected to the fixture positioned at the second station.

6. An automatic needle bearing assembly machine as claimed in claim 1 wherein said probe enters the container off center of the axis of rotation of the latter.

7. An automatic needle bearing assembly machine as claimed in claim 1 wherein a friction belt contacts the fixtures at the third, fourth and fifth stations and a motor drives said belt at the desired rate of speed.

8. An automatic needle bearing assembly machine for assembling needle bearings in a container comprising an endless conveyer mechanism adapted to halt intermittently at a plurality of stations, a series of rotatable fixtures carried by said conveyer mechanism at spaced intervals so that a fixture will be located at each station when the conveyor mechanism is halted, a container feed mechanism at one of said stations for inserting a container into each fixture while located at that station, a needle bearing metering mechanism at a succeeding station for introducing a prescribed number of needle bearings into each container while its supporting fixture is located at that station, means for rotating said fixtures continuously after said needle bearings have been introduced into the container for positioning the bearings by centrifugal force around the inner wall of said container, a probe mechanism at a station following the last named station for momentarily inserting a probing element off center into said container to assure proper positioning of the needle bearings, a retainer inserting mechanism at a subsequent station for inserting a retainer element in the container for holding the assembled bearings in position, and an ejector mechanism for removing the container and assembled bearings from the machine.

9. An automatic needle bearing assembly machine for assembling needle bearings in a container comprising an endless conveyer mechanism adapted to halt intermittently at a plurality of stations, a series of rotatable fixtures carried by said conveyer mechanism at spaced intervals so that a fixture will be located at each station when the conveyer mechanism is halted, a container feed mechanism at one of said stations for inserting a container into each fixture while located at that station, a needle bearing metering mechanism at a succeeding station for introducing a prescribed number of needle bearings into each container while its supporting fixture is located at that station, means for rotating said fixtures continuously after said needle bearings have been introduced into the container for positioning the bearings by centrifugal force around the inner wall of said container, a retainer inserting mechanism at a subsequent station for inserting a retainer element in the container for holding the assembled bearings in position, and an ejector mechanism for removing the container and assembled bearings from the machine.

10. An automatic needle bearing assembly machine for assembly needle bearings in a container comprising an endless conveyer mechanism adapted to halt intermittently at a plurality of stations, a series of rotatable fixtures carried by said conveyer mechanism as spaced intervals so that a fixture will be located at each station when the conveyer mechanism is halted, a container feed mechanism at one of said stations for inserting a container into each fixture while located at that station, a needle bearing metering mechanism at a succeeding station for introducing a prescribed number of needle bearings into each container while its supporting fixture is located at that station, means for rotating said fixtures continuously after said needle bearings have been introduced into the container for positioning the bearings by centrifugal force around the inner wall of said container, and an ejector mechanism for removing the container and assembled bearings from the machine.

11. An automatic needle bearing assembly machine for assembling needle bearings in a container comprising an endless conveyer mechanism adapted to halt intermittently at a plurality of stations, a series of rotatable fixtures carried by said conveyer mechanism at spaced intervals so that a fixture will be located at each station when the conveyer mechanism is halted, a container feed mechanism at one of said stations for inserting a container into each fixture while located at that station, a needle bearing metering mechanism at a succeeding station for introducing a prescribed number of needle bearings into each container while its supporting fixture is located at that station and means for rotating said fixtures continuously after said needle bearings have been introduced into the container for positioning the bearings by centrifugal force around the inner wall of said container.

References Cited in the file of this patent

UNITED STATES PATENTS

| | | |
|---|---|---|
| 1,387,881 | Bingham | Aug. 16, 1921 |
| 1,930,131 | Padgett | Oct. 10, 1933 |
| 1,947,004 | Goddard | Feb. 13, 1934 |
| 2,031,417 | Ketcham | Feb. 18, 1936 |

UNITED STATES PATENT OFFICE
CERTIFICATE OF CORRECTION

Patent No. 2,890,518                                            June 16, 1959

Lloyd Leslie Lee

It is hereby certified that error appears in the printed specification of the above numbered patent requiring correction and that the said Letters Patent should read as corrected below.

Column 2, line 60, for "orientnig" read -- orientating --; column 5, line 33, for "304" read -- 204 --; column 7, line 13, for "container" read -- containers carried --.

Signed and sealed this 27th day of October 1959.

(SEAL)
Attest:

KARL H. AXLINE                                        ROBERT C. WATSON
Attesting Officer                                    Commissioner of Patents